(12) United States Patent
Friesel

(10) Patent No.: US 7,221,307 B1
(45) Date of Patent: May 22, 2007

(54) DETERMINATION OF THE PRESENCE OF CLOSELY SPACED TARGETS

(75) Inventor: Mark A. Friesel, Ewing, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 197 days.

(21) Appl. No.: 10/886,951

(22) Filed: Jul. 8, 2004

(51) Int. Cl.
*G01S 13/66* (2006.01)
(52) U.S. Cl. .................... 342/13; 342/162; 342/90; 342/91; 342/95
(58) Field of Classification Search .................. 342/13, 342/89–103, 159–162
See application file for complete search history.

(56) References Cited

U.S. PATENT DOCUMENTS

| | | | | |
|---|---|---|---|---|
| 3,849,779 | A * | 11/1974 | Boyd | 342/77 |
| 4,532,515 | A * | 7/1985 | Cantrell et al. | 342/147 |
| H374 | H * | 11/1987 | Abo-Zena et al. | 342/378 |
| 5,093,649 | A * | 3/1992 | Johnson | 342/157 |
| 5,485,157 | A * | 1/1996 | Long | 342/160 |
| 5,831,570 | A * | 11/1998 | Ammar et al. | 342/26 B |
| 5,905,459 | A * | 5/1999 | Bunch | 342/92 |
| 5,969,667 | A * | 10/1999 | Farmer et al. | 342/165 |
| 6,104,336 | A * | 8/2000 | Curran et al. | 342/70 |
| 6,801,156 | B1 * | 10/2004 | Wasiewicz | 342/95 |
| 7,047,161 | B1 * | 5/2006 | Friesel | 702/189 |
| 2003/0048214 | A1 * | 3/2003 | Yu | 342/16 |
| 2003/0189512 | A1 * | 10/2003 | Chen et al. | 342/160 |
| 2003/0195890 | A1 * | 10/2003 | Oommen | 707/100 |

OTHER PUBLICATIONS

"A review of recent results in multiple target tracking", Ng, W.; Li, J.; Godsill, S.; Vermaak, J., Image and Signal Processing and Analysis, 2005. ISPA 2005. Proceedings of the 4th International Symposium on Sep. 15-17, 2005 Ps: 40-45.*
"Multi-target detection in FMCW radar", Hua Suchong; Zhou Zhengou; Wang Yue; Zhou Siyong, Radar, 1996. Proceedings., CIE International Conference of Oct. 8-10, 1996 pp. 367-370.*
"MDL approach for multiple low observable track initiation", Chen, H.; Bar-Shalom, Y.; Pattipati, K.R.; Kirubarajan, T., Aerospace and Electronic Systems, IEEE Transactions on vol. 39, Issue 3, Jul. 2003 Ps: 862-882.*
"Signal processing, tracking, and resouce allocation for highly maneuvering closely spaced targets", Proceedings of the SPIE—The International Society of Optical Engineering, vol. 4048, p. 428-39, Sinha-A, Kirubarajan-T, Bar-Shalom-Y.*
"Angle estimation for two unresolved targets with monopulse radar", IEEE Transactions on Aerospace and Electronic Systems, Jul. 2004, vol. 40, No. 3, p. 998-1019, 25 Zhen-Wang, Sinha-A, Willett-P, Bar-Shalom-Y.*
"Data association combined with the probability hypothesis density filter for multitarget tracking", Proceedings of the SPIE—The International Society for Optical Engineering, 2004, vol. 5428, No. 1, p. 464-75, 13 Lin-L, Bar-Shalom-Y, Kirubarajan-T.*

* cited by examiner

*Primary Examiner*—John B. Sotomayor
(74) *Attorney, Agent, or Firm*—Duane Morris, LLP

(57) ABSTRACT

An active or passive sensor observes a region, and generates evidence of the type of target or object viewed. The evidence is processed to determine the prior probability that the object is of a particular type. The prior probability so determined is thresholded to produce an indication of the presence of multiple targets or objects in a range bin, suggestive of shadowing of a target.

4 Claims, 1 Drawing Sheet

DETERMINATION OF THE PRESENCE OF CLOSELY SPACED TARGETS

FIELD OF THE INVENTION

This invention relates to the determination of the presence of two or more closely spaced or "tag-along" targets observed by a sensor or sensor suite.

BACKGROUND OF THE INVENTION

Fusion of digital information is used in areas such as battlefield monitoring and control operations. A battlefield may be observed by a large number of various types of sensors, each of which more-or-less continuously monitors its "field of view" to produce digital information which is evidence of the nature or characteristics of the object or objects within the field of view. If the platform on which the sensor is mounted is moving, the field of view may change with time. Such sensors receive raw data from an observed direction or space in either a passive or an active manner, and process the information according to some algorithm in order to make a determination of the nature of the object or condition. For example, a radar system operating as an active sensor may transmit radar signals in a desired direction, and then processes signals returned from a target to determine various characteristics of the received signal in order to characterize the target as, say, an F-15 fighter aircraft rather than a C-130 transport aircraft. A passive sensor might detect the emissions of an active sensor carried by a remote platform, determine the type of sensor detected, and identify platforms capable of carrying such an active sensor. Another passive sensor might respond to the spectral frequency distribution of a jet engine. In all cases, the raw sensed signals are processed to put them into the form of evidence of a characteristic of the object, and the evidence is applied to a decision-making algorithm to produce taxonomic (type) evidence as to the nature of the object.

A great deal of work has been done in the field of fusion of the outputs of various sensors associated with a battle region, in order to combine or rationalize the results of the many sensors observing the region from different vantage points under different operating conditions. Work has also been done on the combining or rationalization of the data produced by each individual sensor during sequential or multiple independent observations of its field.

Various current methods are used to update likelihood estimates from new sensor data or measurements. For this purpose, the sensor(s) are calibrated, in that the likelihood of generating evidence such as evidence E when the sensor(s) observe a target of type "a" is known. In FIG. 1, a system 10 includes a sensor 12 which observes a region designated generally as 18 lying between skewed field-of-view lines 18'. Sensor 12 includes active or passive transducers and their associated electronics, illustrated as a transducer(s) block 14. Block 14, if active, may be, for example, a radar or lidar system, which transmits signals into region 18 and receives return or reflected signals from targets therein, as for example target object 20. In the case of a passive sensor, block 14 may be, for example, a sensor which senses emissions radiated by a jet engine. Of whatever type, transducer block 14 produces "raw" signals which can be processed to determine some characteristics of the object 20.

The raw transducer data produced by block 14 of FIG. 1 is applied to a processing block 16 and processed to extract information about the object. Such processing, in the case of a radar or lidar, might determine the range of the target from the transducer, its altitude and speed, and possibly some information about its dimensions. In the case of a passive sensor, the emitted radiations might be applied to a spectrum analyzer to determine the frequency distribution. The processed data produced by block 16 represents evidence of the characteristics of the target or object. The evidence information or data produced by block 16 is applied to a taxonomic determination block 22.

The evidence data or information applied to block 22 is further processed to produce a taxonomic (type) classification of the sensed object 20. Such a classification in the case of a radar type sensor might use knowledge of the speed of a target in conjunction with its size to determine that it is a fighter aircraft rather than a cargo aircraft. In many cases, the type of engine used by the target may be determined; in other words, the sensor and its processing may be able to identify the engine as being one typically used in a particular type of aircraft, as for example an F-15, F-16, commercial airliner, and the like. An emission sensor might deem an object having a dominant emission frequency of 100 KHz to be an aircraft with a J-100 engine, and an object with a dominant emission frequency of 120 KHz to include a J-150 engine. The evidence information is subject to error, and the results are described in terms of probabilities. In one prior art arrangement, block 22 performs the taxonomic classification by the use of Bayes equation or algorithm. Use of Bayes equation to update likelihood estimates typically assumes a uniform distribution for initialization, and then uses the previous estimate as a prior distribution. Bayes conditional equations can be formed relating objects and evidence of their characteristics $$P(a|E_1) = \frac{p(E_1|a)p(a)}{p(E_1|a)p(a) + p(E_1|b)p(b)} \quad 1$$

where

"a" and "b" are types of possible objects or targets that might be observed;

p(a) is the prior probability that the object is type a;

p(b) is the prior probability that the object is type b;

$P(a|E_1)$ is the probability that the object is type "a" when the sensor produced evidence $E_1$.

$P(E_1|a)$ is the probability that the sensor produces evidence $E_1$ when type "a" is observed.

$P(E_1|b)$ is the probability that the sensor produces evidence $E_1$ when type "b" is observed. In equation 1, the possible densities of objects, which is to say the prior probabilities p(a) and p(b) are in truth binary and complementary, so that p(a) is either 1 or 0. However, there is no way to know which type is observed, and no means, other than multiple observations as used in the prior art, to select or identify one of type "a" and type "b" over the other. The resulting taxonomic determination is made available at a sensor output port 12o.

Improved sensor processing is desired.

SUMMARY OF THE INVENTION

A method according to an aspect of the invention is for detection of remote targets. The method comprises the step of receiving from a remote target a plurality of signals, which may be either (one of) reflected or transmitted signals, containing evidence of target properties. These received signals are processed to obtain a prior probability that the received signals contain evidence of the properties of more than one target.

According to an advantageous mode of the method of this aspect of the invention, the processing step comprises the step of counting the number $N_1$ of occurrences out of N in which the received signals contain evidence of the properties of a first target type. The processing step further comprises determining the binomial probability or likelihood $b_N(N_1|a)$ that the received signals include evidence of the properties of the first type target the number $N_1$ of times when the target is the first type target by $$b_N(N_1|a) = \binom{N}{N_1} p(E_1|a)^{N_1} p(E_2|a)^{N-N_1} \quad (1)$$

where $E_2$ represents any evidence other than evidence $E_1$. A determination is made of the binomial probability or likelihood $b_N(N_1|b)$ that evidence $E_1$ of the properties of the first type target is received or found given that a second target is observed, by $$b_N(N_1|b) = \binom{N}{N_1} p(E_1|b)^{N_1} p(E_2|b)^{N-N_1} \quad (2)$$

where the "second target" is any type target other than the first type target. The prior probability that the target is the first type target is determined, by the steps of determining $v_1$, which represents the actual number of times that object "a" was observed $$v_1 = \frac{N_1 - Np(E_1|b)}{p(E_1|a) - p(E_1|b)} \quad (3)$$

Following the determination of $v_1$, gamma ($\gamma$) is determined by $$\gamma = \frac{v_1 p(E_1|a)}{v_1 p(E_1|a) + (N - v_1)p(E_1|b)} \quad (4)$$

and the prior probability p(a) of the target being the first type target is determined by $$p(a) = \frac{\gamma p(E_1|b)}{p(E_1|a)(1-\gamma) + p(E_1|b)} \quad (5)$$

In a most preferred mode of either mode of the method of this aspect of the invention, the further step is performed of comparing the prior probability with a predetermined threshold value. A "two target" or "multiple target" signal is generated when the prior probability exceeds the threshold.

DESCRIPTION OF THE INVENTION

Figure 1:
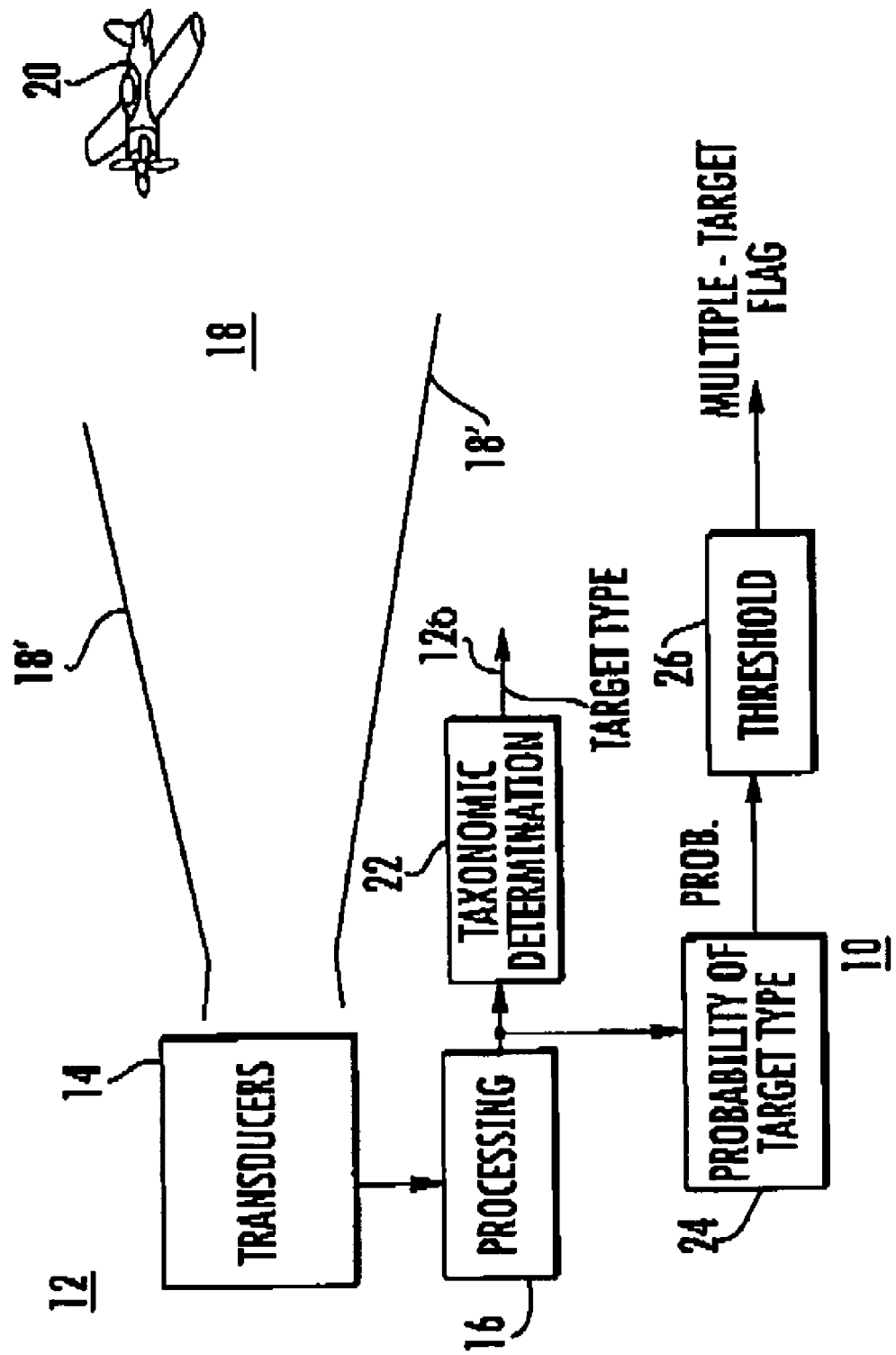
FIG. 1 is a simplified block diagram of a sensor arrangement for determining the type of target and for determining the presence of multiple targets according to an aspect of the invention.

In FIG. 1, probability-of-target-type block 24 represents a portion of the function of multiple target presence detection or determination. Such multiple targets may arise under those circumstances in which one aircraft or vehicle shadows another, flying so closely behind that the two targets lie within the same range bin of the sensor. It can be important to detect such multiple targets, especially in a military or antiterror context. The remaining portion of the function of multiple target presence detection is performed by a thresholding block 26.

In general, the processing performed in block 24 of FIG. 1 uses the same information from the sensor or transducer that is currently used to make the taxonomic determination in block 22. More particularly, a determination is made of the prior probability that more than one target or object is observed by noting the number of occurrences of evidence of a particular type of target out of a particular number of observations.

The processing in block 24 of FIG. 1 begins with counting the number N of observations of the target region 18. This number may be the number of observations within a particular time span, or it may be determined by the number of sensors available to make determinations, the duration of visibility of the target region, and the like. Within this number N of observations, the number $N_1$ of observations which produce evidence $E_1$ are noted, where evidence $E_1$ is evidence of a particular target type. As an example, a total of N=100 observations might be made of a target 20 in target region 18, and of those observations, $N_1$=90 might represent evidence of the presence of a particular aircraft engine type, such as J-100.

The processing in block 24 of FIG. 1 includes determining the binomial probability or likelihood $b_N(N_1|a)$ that the system get or generate evidence $E_1$ of the properties of the first target "a" $N_1$ out of N (90 times out of 100 in the example) given that target "a" is actually the observed target by $$b_N(N_1|a) = \binom{N}{N_1} p(E_1|a)^{N_1} p(E_2|a)^{N-N_1} \quad (1)$$

where $E_2$ represents any evidence other than evidence $E_1$.

The next step in the determination performed by block 24 is to determine the binomial probability $b_N(N_1|b)$ that we would get the same evidence $E_1$ of the properties of the first target "a" $N_1$ out of N times given that some target other than target "a" is actually observed. The same general equation is used $$b_N(N_1|b) = \binom{N}{N_1} p(E_1|b)^{N_1} p(E_2|b)^{N-N_1} \quad (2)$$

Next, the prior probability that the observed target is the first target is determined, by the step of determining $v_1$, which represents the actual number of times that object "a" was observed $$v_1 = \frac{N_1 - Np(E_1|b)}{p(E_1|a) - p(E_1|b)} \quad (3)$$

Following the determination of $v_1$, parameter $\gamma$ is determined by $$\gamma = \frac{v_1 p(E_1|a)}{v_1 p(E_1|a) + (N - v_1)p(E_1|b)} \quad (4)$$

Following the determination of $\gamma$, the prior probability $p(a)$ of target "a" is determined by $$p(a) = \frac{\gamma p(E_1|b)}{p(E_1|a)(1-\gamma) + p(E_1|b)} \quad (5)$$

where $p(a)$ is the desired probability that the target is of type "a". In the presence of a shadowing vehicle, the probability of type "a" may be lower than when only target type "a" is observed. Under certain conditions in which $p(E_1|a)=p(E_1|b)$, the denominator of equation (3) will go to zero, which makes the equation undefined. When this occurs, then $p(a)$ is given by $N_1/N$.

Simple thresholding of the probability $p(a)$ allows the probability to be used to signal or report the presence or absence of multiple targets. For example, if evidence $E_1$ of the presence of target type "a" is generated 90 times out of 100, necessarily evidence $E_2$ of "not-target-a" is generated 10 times. If $p(a)$ is far enough from unity for target "a" we can declare the presence of multiple targets.

Block 26 of FIG. 1 receives the probabilities determined by block 24, and applies a threshold, which may for example be 80% or 90%, as desired. Those skilled in the art will understand that the threshold value depends upon the alarm level which is desired, and the characteristics of the sensor(s). The threshold may be set to a very high level, such as 99%, when the nation is at high alert, or in a situation of high risk, to thereby flag any possibility that shadowing is occurring, or it may be set to a lower level, such as, for example, 70%, when a lower risk exists, and fewer alarms are desired.

A method according to an aspect of the invention is for detection of remote targets (20). The method comprises the step of receiving from a remote target (20) a plurality of signals, which may be either (one of) reflected or transmitted signals, containing evidence of target properties. These received signals are processed (14, 16, 22) to obtain a prior probability, such as $p(a)$, that the received signals contain evidence of the properties of more than one target.

According to an advantageous mode of the method of this aspect of the invention, the processing step comprises the step of counting the number of occurrences [for example, $N_1$ 90 out of $N=100$ in the example] in which the received signals contain evidence [$E_1$] of the properties of a first target ["a"]. The processing step further comprises determining the binomial probability or likelihood [$b_N(N_1|a)$] that the received signals would include or get evidence [$E_1$] of the properties of the first target ["a"] the number of times [$N_1$ or 90 out of 100] that the observed target is first ["a"] target by $$b_N(N_1|a) = \binom{N}{N_1} p(E_1|a)^{N_1} p(E_2|a)^{N-N_1} \quad (1)$$

where $E_2$ represents any evidence other than evidence $E_1$. A determination is made of the binomial probability [$b_N(N_1|a)$] or likelihood that we would get evidence [$E_1$] of the properties of the first target ["a"] given that a second target ["b" or "not-a"] is also observed by $$b_N(N_1|b) = \binom{N}{N_1} p(E_1|b)^{N_1} p(E_2|b)^{N-N_1} \quad (2)$$

where the "second target" is any target other than the first target ["a"]. The prior probability that target is the first ["a"] target is determined, by the step of determining $v_1$, which represents the actual number of times that first object ["a"] was observed $$v_1 = \frac{N_1 - Np(E_1|b)}{p(E_1|a) - p(E_1|b)} \quad (3)$$

Following the determination of $v_1$, gamma ($\gamma$) is determined by $$\gamma = \frac{v_1 p(E_1|a)}{v_1 p(E_1|a) + (N - v_1)p(E_1|b)} \quad (4)$$

and the prior probability [$p(a)$] of the target being the first target ["a"] is determined by $$p(a) = \frac{\gamma p(E_1|b)}{p(E_1|a)(1-\gamma) + p(E_1|b)} \quad (5)$$

In a most preferred mode of either mode of the method of this aspect of the invention, the further step is performed of comparing the prior probability with a predetermined threshold value. A "two target" or "multiple target" signal is generated when the prior probability exceeds the threshold.

What is claimed is:

1. A method for detection of remote targets, said method comprising the steps of:
   receiving from a remote target a plurality of one of reflected and transmitted signals containing evidence of target properties, to thereby produce received signals; and
   processing said received signals to obtain a prior probability that the received signals contain evidence of the properties of more than one target.

2. A method according to claim 1, further comprising the step of:
   comparing said prior probability with a predetermined threshold value; and
   generating a "multiple target" signal when said prior probability exceeds said threshold.

3. A method for detection of remote targets, said method comprising the steps of:
- receiving from a remote target a plurality of one of reflected and transmitted signals containing evidence of target properties, to thereby produce received signals; and
- processing said received signals to obtain a prior probability that the received signals contain evidence of the properties of more than one target;
- wherein said processing step comprises the steps of;
- counting the number $N_1$ of occurrences out of N occurrences in which said received signals contain evidence of the properties of a first target;
- determining the binomial probability $b_N(N_1|a)$ that evidence $E_1$ of the properties of the first target "a" is received $N_1$ times given that target "a" is observed, by $$b_N(N_1 | a) = \binom{N}{N_1} p(E_1 | a)^{N_1} p(E_2 | a)^{N_1} \quad (1)$$

where $E_2$ represents any evidence other than evidence $E_1$;
- determining the binomial probability $b_N(N_1|b)$ that evidence $E_1$ of the properties of the first target "a" is received given that a second target "b" is observed, by $$b_N(N_1 | b) = \binom{N}{N_1} p(E_1 | b)^{N_1} p(E_2 | b)^{N-N_1} \quad (2)$$

where the "second target" is any target other than the first target;
- determining the prior probability that target is the first target "a", by determining $v_1$, which represents the actual number of times that the first target "a" was observed, by $$v_1 = \frac{N_1 - Np(E_1 | b)}{p(E_1 | a) - p(E_1 | b)}; \quad (3)$$

determining Gamma ($\gamma$) by $$\gamma = \frac{v_1 p(E_1 | a)}{v_1 p(E_1 | a) + (N - v_1) p(E_1 | b)}; \text{ and} \quad (4)$$

determining the prior probability p(a) of a first target by $$p(a) = \frac{\gamma p(E_1 | b)}{p(E_1 | a)(1 - \gamma) + p(E_1 | b)}. \quad (5)$$

4. A method according to claim 3, further comprising the step of:
- comparing said prior probability with a predetermined threshold value; and
- generating a "multiple target" signal when said prior probability exceeds said threshold.

* * * * *